United States Patent
Church et al.

(10) Patent No.: US 6,932,536 B2
(45) Date of Patent: Aug. 23, 2005

(54) MULTI-BODY ASSEMBLY CONNECTED BY A THREADED FASTENER

(75) Inventors: David R. Church, Richland, MI (US); Daniel E. Banks, Climax, MI (US); James R. Clark, Plainwell, MI (US); Thomas L. Runels, Battle Creek, MI (US)

(73) Assignee: Dana Corporation, Toledo, OH (US)

( * ) Notice: Subject to any disclaimer, the term of this patent is extended or adjusted under 35 U.S.C. 154(b) by 36 days.

(21) Appl. No.: 10/411,951

(22) Filed: Apr. 11, 2003

(65) Prior Publication Data
US 2004/0202508 A1 Oct. 14, 2004

(51) Int. Cl.$^7$ ................................................ F16D 1/00
(52) U.S. Cl. .................................................... 403/408.1
(58) Field of Search ............................... 403/408.1, 11, 403/288

(56) References Cited

U.S. PATENT DOCUMENTS

| | | | | |
|---|---|---|---|---|
| 3,456,972 A | * | 7/1969 | Drotar | 403/408.1 |
| 5,220,854 A | * | 6/1993 | Allart et al. | 403/408.1 X |
| 5,924,813 A | * | 7/1999 | Sasaki | 403/408.1 X |

* cited by examiner

Primary Examiner—John R. Cottingham
(74) Attorney, Agent, or Firm—Dykema Gossett PLLC

(57) ABSTRACT

An assembly is provided which includes a first body with a blind bore with an enlarged countersunk portion. The assembly also has a second body with an aperture aligned with the first body bore. A fastener is provided having a head compressively engages the second body. A shank of the fastener has threaded engagement with the bore, and at least 10% of a free length of the shank is encircled by the countersunk portion of the bore.

11 Claims, 1 Drawing Sheet

MULTI-BODY ASSEMBLY CONNECTED BY A THREADED FASTENER

BACKGROUND OF THE INVENTION

1. Field of the Invention

The present invention relates to physical bodies which are connected together into an assembly by a threaded fastener. More particularly, the present invention relates to assemblies provided by metallic bodies connected by headed, threaded fasteners wherein the fasteners are inserted into blind bores of one of the bodies of the assembly.

2. Discussion of Related Art

In the most recent three decades, there has been a constant quest to improve the fuel economy of automotive vehicles. This quest for fuel economy is driven by both environmental and national defense considerations. To increase fuel economy three approaches have been utilized. The first approach is to increase efficiency of the engine which powers an automotive vehicle. The second approach is to lower the aerodynamic drag of a vehicle. The third approach is to lower the weight of the vehicle.

To lower vehicle weight and aerodynamic drag often requires a reduction in vehicle the size of components. Smaller sized components often dictate the utilization of smaller fasteners.

One such smaller component is a caliper assembly for an air-actuated disc brake of a truck-like vehicle. Caliper assemblies have various parts which are connected by threaded fasteners. The fasteners must not only endure large amounts of vibration, but must also endure thermal cyclic loading, resultant of brake operation. Because the brake calipers are adjacent to a vehicle's wheels, it is preferable that threadably connected subassemblies of the caliper utilize blind bores so as to inhibit infiltration of moisture, dirt and other contaminants which can degrade the threaded connections.

To reduce component size, it is preferable that the threaded fasteners utilized be as short as possible in order to meet clearance requirements of the brake caliper with other portions of the vehicle brake and vehicle suspension systems.

Through empirical experience it has been found that in certain situations it is difficult to maintain clamping load between different components of the disc brake caliper assembly. One of the most obvious solutions to rectify or to increase clamping load is to add a nut on the opposite end of the fastener so that two connected bodies may be compressed together by torsion of a fastener, such as a bolt. However, the use of a nut with a bolt requires typically an increase in length of the bolt. Additionally, the use of a nut with a bolt prevents the utilization of a blind bore. If the clamping load by a group of fasteners which connect one component with another component is insufficient, additional fasteners may be required.

The use of additional fasteners is disadvantageous from a cost standpoint of increased fastener costs and increased machining operations to drill and tap the additional threaded bores which receive the fastener. Interference-type threads have empirically been used in an attempt to increase clamping load. However, interference-type threads typically do not significantly add to clamping load and additionally add to the disadvantage of increasing difficulty of disassembly for maintenance operations. Also, interference-type threads greatly increase the cost of initial assembly of the brake caliper.

An increase of thread quality can lead to slight increases of clamping load. However, such increases are typically not as great as desired. Increases in thread quality also lead to increased fabrication cost.

It is desirable to provide an assembly of threadably connected components wherein clamping load can be maximized while still utilizing threaded fasteners which are inserted into blind bores having lower cost precision threaded connective arrangements.

SUMMARY OF THE INVENTION

To make manifest the aforementioned desires, a revelation of the present invention is brought forth. In the preferred embodiment, the present invention provides an assembly which has a first body such as a brake housing for an air-actuated caliper disc brake. The housing has a cavity which is closed by an adjuster face place. The housing has a mating face. The mating face has a collection of penetrating blind bores extending therein. Each of the bores has a blind end and an opposite access end. The access end of the blind bores is adjacent to the mating face of the brake housing. Each bore adjacent its access end has an enlarged countersunk or counterbore portion.

The adjuster plate also has a contact surface for mating engagement with the contact surface of the brake housing. The contact surface of the second body has a series of apertures which are aligned with the bores of the brake housing. Capscrew fasteners are provided.

Each capscrew fastener has a head portion with a diameter greater than the countersunk portion of the brake housing bore. The capscrew has a shank with a threaded portion for threaded engagement with a threaded portion of the brake housing bore. At least 50% of the free length of the capscrew shank is engaged with the threaded portion of the brake housing threaded bore. At least 10% of the free length of the shank is encircled by the countersunk portion of the first body bore. When the capscrew is properly torqued with its head compressively engaged with the adjuster plate, a portion of the shank which is encircled by the countersunk portion of the first body bore is elongated, thereby increasing the clamping load of the capscrew head against the adjuster plate.

The above-noted elongation allows the portion of the capscrew shank to be stressed significantly higher than in most assembly arrangements. As a result of the increased clamp loading, the bolts remain tight even during the cyclic vibration of a disc brake caliper due to its actuation and thermal loading. This increased clamp loading is achieved without the utilization of nuts or especially high quality threads for the capscrew threaded bore within the disc brake housing.

A greater understanding of the present invention can be gained from a review of the invention as it is disclosed in the accompanying drawings and detailed description.

DETAILED DESCRIPTION OF THE INVENTION

Figure 1:
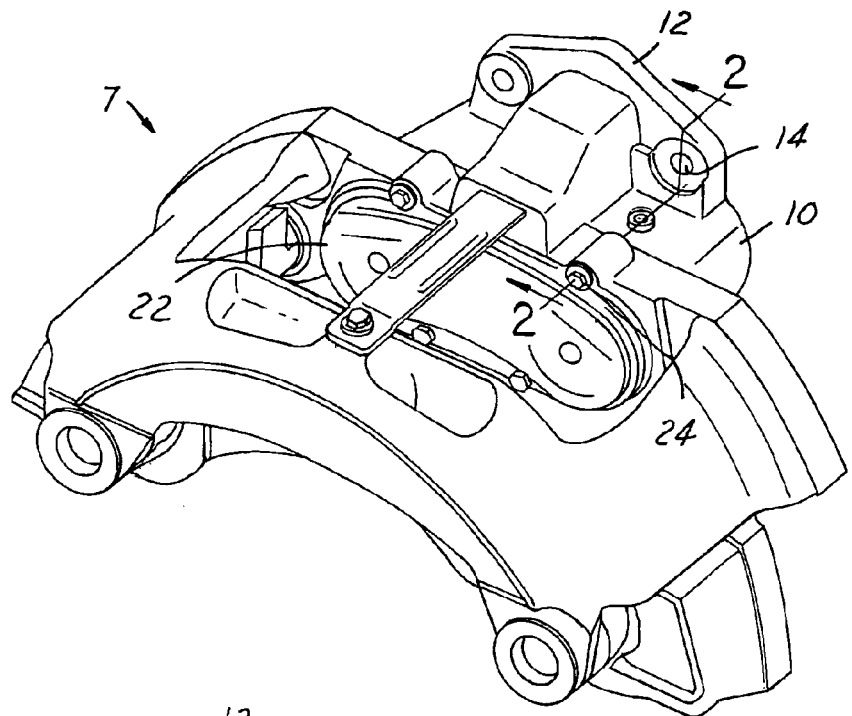
FIG. 1 is a perspective view of an air-actuated disc brake caliper assembly having an inventive assembly of components of the present invention.
Figure 2:
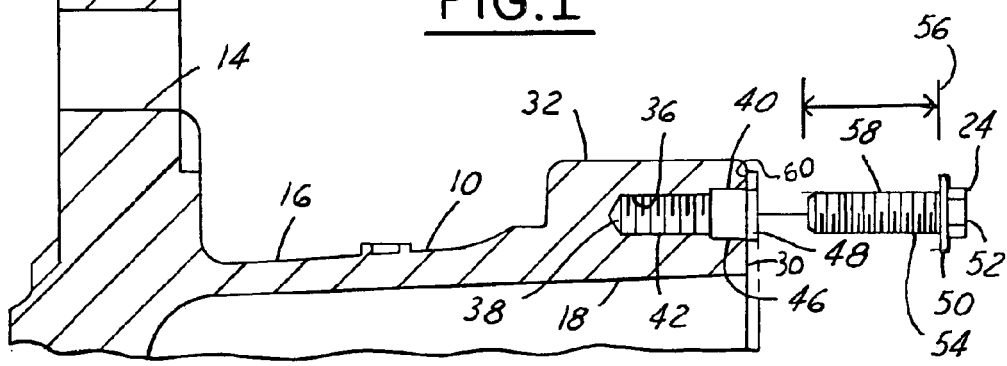
FIG. 2 is a partial sectional view taken along line 2—2 of FIG. 1 with a fastener of the assembly shown in FIG. 1 being removed for illustration.
Figure 3:
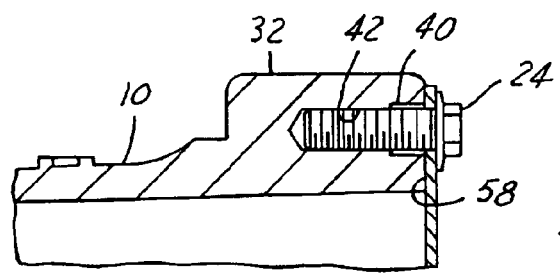
FIG. 3 is a view similar to that of FIG. 2 with the fastener shown in FIG. 2 being threadably inserted within a threaded bore of a brake housing of the disc brake caliper assembly.

Referring to FIGS. 1–3, a disc brake caliper assembly 7 is provided. The disc brake caliper assembly includes a brake housing 10. The brake housing 10 has a mounting face 12 having a connecter hole 14 which allows the caliper assembly 7 to be connected with a portion of the suspension system (not shown) of the vehicle. The brake housing 10 also has an extending body portion 16 with an adjuster cavity 18. The adjuster cavity 18 mounts an adjuster assembly (not shown) which is operatively associated with an adjuster plate 22. The adjuster plate 22 is threadably connected with the brake housing 10 by a series of four capscrew threaded fasteners 24.

The brake housing 10 has a mating face 30. The mating face 30 is on a common plane about the whole peripheral border of the cavity 18. Adjacent to the mating face 30 along its top end, the housing has exterior extending bosses 32. Along its lower end the housing extends into cavity 18, bosses similar to bosses 32, which extend inwardly towards cavity 18. Each boss has drilled therein a bore 36 penetrating into the mating face 30. The bore 36 has a blind end 38. The bore 36 has an opposite access end 40 which is adjacent to the mating face 30. The bore 36 also has a threaded portion 42. The bore 36 also has adjacent its access end 40 an enlarged countersunk or counterbore portion 46.

The adjuster plate 22, which is typically a metal member like the brake housing 10, has a series of apertures 48 which are aligned with the various bores 36 provided in the brake housing 10.

The capscrews 24 have a portion of their head 50, which is larger in its diameter than the enlarged portion of the bore 36 provided by the counterbore 46. The capscrew 24 can also have a hex head portion 52 provided for receipt into a socket of a torquing tool.

The capscrew 24 has a shank 54. The shank 54 has a free length 56. The shank 54 also has a threaded portion 58 which extends as shown the entire free length 56.

When the capscrew 24 threadably connects the adjuster plate 22 with the brake housing 10, the head portion 50 of the capscrew will be compressively engaged with the adjuster plate 22 on a side opposite a contact face 60 of the adjuster plate. The adjuster plate as shown is relatively thin with respect to the thickness or length of the bore 36 within the brake housing 10.

The apertures 48 typically will be large enough that they are non-engaging with the threaded portion 58 of the capscrew. At least 50% and preferably at least 60% plus or minus 7% of the free length of the capscrew 24 will be threadably engaged with the threaded portion 42 of the bore 36. A proper torquing of the capscrew 24 will cause a portion of the capscrew shank 54 which is encircled by the counterbore 46, to be elongated. It is desirable that this portion of the capscrew to be elongated be at least 10% of the free length of the shank 56. In many applications it is preferable that the portion to be elongated be at least 1 shank diameter in length and preferably be up to 5 shank diameters in length.

When the capscrew 24 is properly torqued, the portion of the capscrew shank 54 which is encircled by the counterbore portion 46 will be stressed to approximately at least 75% of its yield strength and preferably at least 80 or 85% of its yield strength. Such a connection provides an elongation in the shank which maintains clamping load, thereby resisting loosening to a high degree. Preferably, medium or lower quality threads can be used within the threaded portion 42 and on the capscrew shank so that component and manufacturing costs can be held to a minimum. Typically, the portion of the shank 54 which is encircled by the counterbore 46 will be elongated 0.003 mm plus or minus 0.001 mm per 1 mm of length.

To further enhance the clamping retention of the assembly which includes the brake housing 10 and the adjuster plate 22, an enhanced torsional frictional coating can be placed on the shank 54. Experience has shown that the frictional coating, such as loctite, should be at least 10% away from a front end (the end which first enters into the bore 36) and the frictional enhancing coating should not extend past the front half of the free length of the shank.

An embodiment of the present invention has been shown. However, it will apparent to those skilled in the art of the various modifications which can be made to the present invention without departing from the spirit or scope of the invention as it is encompassed by the following claims.

What is claimed is:

1. An assembly comprising:
   a first body having a mating face, said mating face having a penetrating bore extending therein, said bore having a blind end and an opposite access end, said access end being adjacent said mating face, and said bore having an enlarged countersunk portion adjacent said access end;
   a second body with a contact face mating with said mating face of said first body, said second body having an aperture aligned with said first body bore; and
   a fastener, said fastener having a shank with an integrally formed head connected thereto, said head compressively engaging said second body and having a portion with a diameter larger than said countersunk portion of said first body bore, said shank having a threaded portion in threaded engagement with a threaded portion of said first body bore, and wherein at least 50% of a free length of said shank is engaged with said threaded portion of said first body bore, and wherein at least 10% of said free length of said shank is encircled by said countersunk portion of said first body bore
   wherein said first and second bodies are portions of a brake caliper.

2. An assembly as described in claim 1, wherein said mating face has a plurality of said penetrating bores, and wherein said second body has a plurality of said apertures aligned with said penetrating bores, and wherein a plurality of said fasteners have heads compressively contacting with said second body and threaded portions engaged with corresponding threaded portions of said first body bores.

3. An assembly as described in claim 1, wherein 60%, plus or minus 7%, of said fastener threaded portion is threadably engaged with said threaded portion of said first body bore.

4. An assembly as described in claim 1, wherein said fastener shank encircled by said countersunk portion of said first body bore is stressed to about 75% or more of its yield strength.

5. An assembly as described in claim 1, wherein said shank encircled by said countersunk portion of said first body bore is stressed to at least approximately 80% of the yield strength of said shank.

6. An assembly as described in claim 1, wherein said fastener shank encircled by said first body bore countersunk portion is stressed to at least approximately 85% of the yield strength of said shank.

7. An assembly as described in claim 1, wherein said fastener is a capscrew.

8. An assembly as described in claim 1, wherein threads in said threaded portions of said shank and said first body are non-interference type threads.

9. An assembly as described in claim 1, wherein said first body has a boss on its outer perimeter, and wherein said penetrating bore penetrates into said boss.

10. An assembly as described in claim 1, wherein there is a friction enhancer on said threaded portion of said shank, and wherein said friction enhancer is distanced from a front end of said shank at least 10% of said free length of said shank, and said friction enhancer is distanced from said head of said fastener at least 50% of said free length of said shank.

11. An assembly as described in claim 1, wherein a length of said countersunk portion of said bore is approximately 1 to 5 diameters of said fastener shank.

* * * * *